United States Patent
Ferrari

[15] 3,677,626
[45] July 18, 1972

[54] IMAGE DISPLAY FROM CONTINUOUSLY MOVING IMAGE CARRIER

[72] Inventor: Leonard A. Ferrari, San Dimas, Calif.

[73] Assignee: Bell & Howell Company, Chicago, Ill.

[22] Filed: Jan. 11, 1971

[21] Appl. No.: 105,393

[52] U.S. Cl. .................................352/109, 352/92, 352/110
[51] Int. Cl. ...........................................................G03b 41/10
[58] Field of Search ...................352/92, 109, 110; 318/640; 178/7.6

[56] References Cited

UNITED STATES PATENTS

| | | | |
|---|---|---|---|
| 2,843,006 | 7/1958 | Tyler | 352/109 |
| 3,539,250 | 11/1970 | Johnston | 352/109 |
| 3,544,207 | 12/1970 | John, Jr. | 352/92 |
| 3,067,284 | 12/1962 | Baldwin | 352/109 |

Primary Examiner—Samuel S. Matthews
Assistant Examiner—Russell E. Adams, Jr.
Attorney—Luc P. Benoit

[57] ABSTRACT

Images are displayed from a continuously moving image carrier with the aid of a repeatedly advanced and reset optical compensator. The compensator is reset by electric pulse doublets which are generated by differentiator and single-stage multivibrator equipment.

12 Claims, 9 Drawing Figures

LEONARD A. FERRARI
INVENTOR.
BY Luc P. Benoit
ATTORNEY.

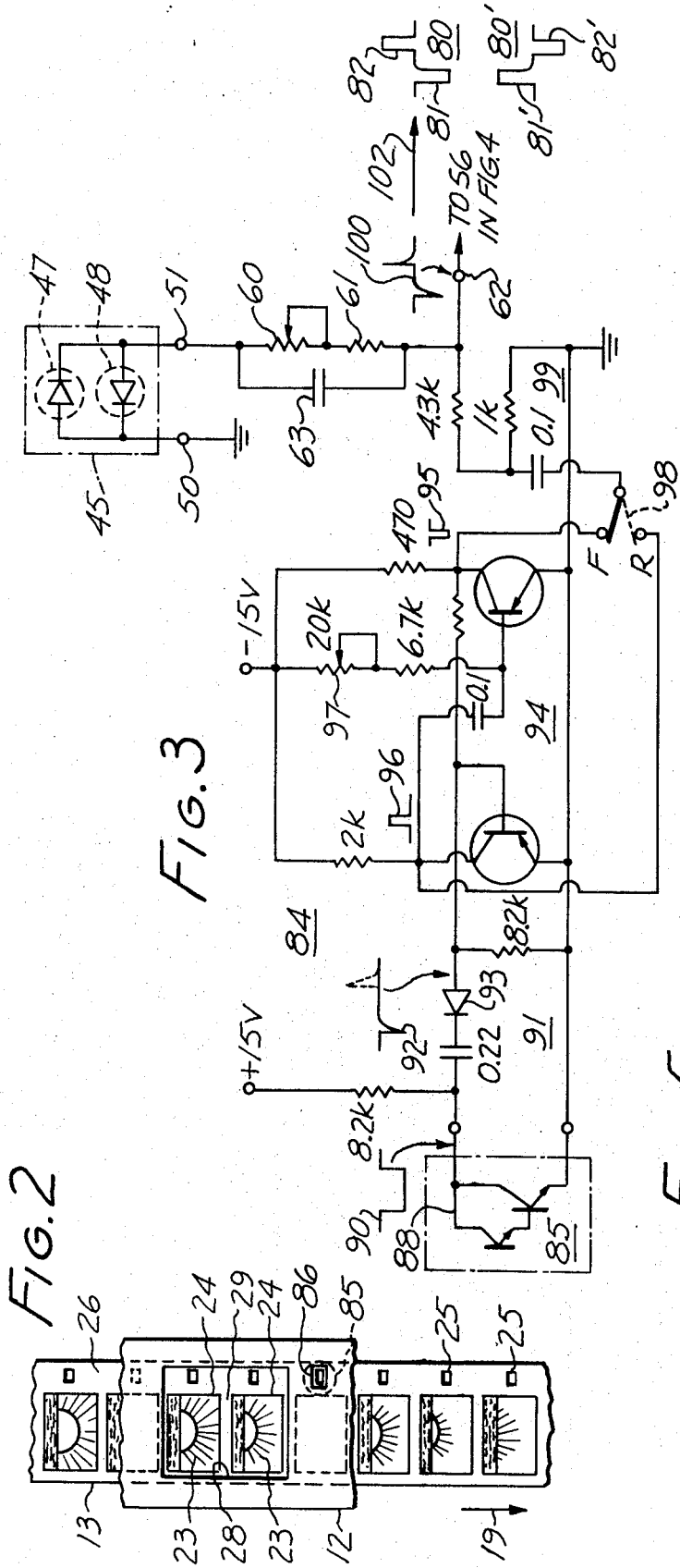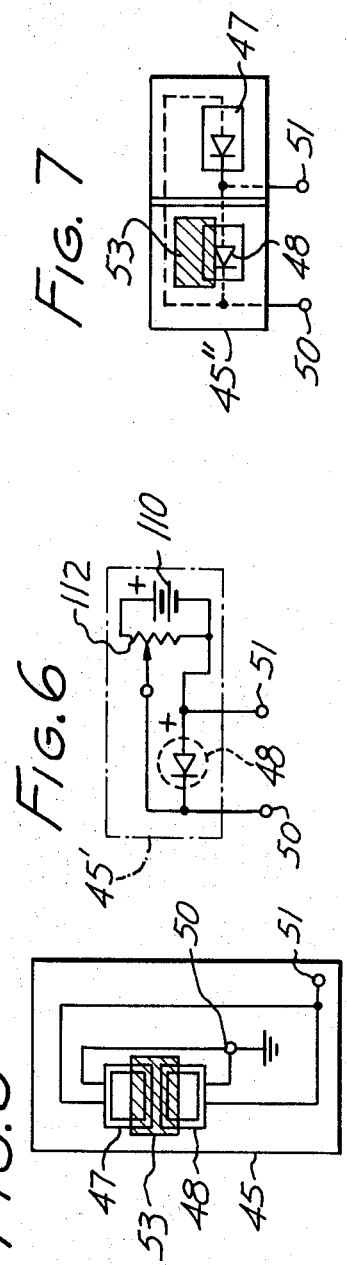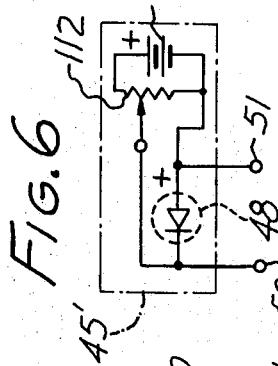

Patented July 18, 1972 3,677,626

IMAGE DISPLAY FROM CONTINUOUSLY MOVING IMAGE CARRIER

CROSS-REFERENCE TO RELATED APPLICATION

Subject matter herein described and shown is disclosed and claimed in the copending Patent Application Ser. No. 89,323 filed Nov. 13, 1970, by Ellen B. Lancor, administratrix of Joseph H. Lancor, Jr., deceased, and Leonard A. Ferrari; assigned to the present assignee, and herewith incorporated by reference herein.

BACKGROUND OF THE INVENTION

1. Field of the Invention

The subject invention relates to optics and, more particularly, to the display of images from a continuously moving image carrier.

2. Description of the Prior Art

Proposals have been made in the past to display images from a continuously moving image carrier with the aid of a repeatedly advanced and reset optical compensator, such as a compensator mirror. It has been discovered that such image display may be significantly improved by resetting the optical compensator with a power pulse doublet composed of oppositely poled pulses.

An example of power pulse doublet generating methods and equipment is in a different contaxt described and illustrated on pages 31 to 36 of the LASER DISPLAY STUDY by C.E. Baker and H.W. Parker, Technical Report No. RADC-TR-65-169 (Rome Air Development Center, Griffiss Air Force Base, N.Y., July 1965).

SUMMARY OF THE INVENTION

The subject invention provides improvements over the techniques and equipment of the above mentioned LASER DISPLAY STUDY, and moreover provides methods and apparatus for resetting electrically energizable optical compensators in the display of images from a substantially continuously moving carrier.

From one aspect thereof, the subject invention is concerned with a method of displaying images of a succession of recordings from a substantially continuously moving carrier, with the aid of an electrically energizable optical compensator of a type being repeatedly advanced through a range of motion so as to compensate for the continuous carrier movement, and being reset through that range of motion by electric pulse doublets. The invention according to this aspect resides in the improvement comprising, in combination, the steps of sensing each need for a resetting of the optical compensator through the range of motion, providing an electric pulse in response to each sensed need for a resetting, differentiating the latter electric pulse so as to provide a pair of oppositely poled electric spikes, subjecting each pair of the oppositely poled electric spikes to electronic amplification and clipping the electric spikes during the amplification so as to generate an electric pulse doublet for resetting the optical compensator, and applying the generated electric pulse doublet to the optical compensator to reset the compensator.

Another aspect of the subject invention is also concerned with a method of the above mentioned type, and resides in the improvement comprising, in combination, the steps of sensing each need for resetting of the optical compensator through the above mentioned range of motion, providing a first electric pulse in response to each sensed need for resetting, differentiating and rectifying the fist electric pulse so as to provide a first electric spike, providing a second electric pulse in response to the first electric spike, differentiating the second electric pulse so as to provide a pair of oppositely poled second and third electric spikes, subjecting each pair of the oppositely poled second and third electric spikes to electronic amplification and clipping the second and third electric spikes during the amplification so as to generate an electric pulse doublet for resetting the optical compensator, and applying the generated electric pulse doublet to the optical compensator to reset the compensator.

A further aspect of the subject invention is also concerned with a method of the above mentioned type, and resides in the improvement comprising, in combination, the steps of sensing relative movements of each displayed image in a first direction corresponding to the direction of movement of the carrier, and in a second direction opposite to the first direction, providing a first electric signal indicative of sensed movements of each displayed image in the first and second directions, amplifying the first electric signal to provide a second electric signal corresponding to the first electric signal, controlling the advance of the electrically energizable optical compensator with the second electric signal, sensing each need for a resetting of the optical compensator through the above mentioned range of motion, providing a first electric pulse and an oppositely poled second electric pulse in response to each sensed need for a resetting, interrupting the amplification of the first electric signal in response to the first and second electric pulses, amplifying the first and second electric pulses to produce an amplified electric pulse doublet, and resetting the optical compensator with the amplified electric pulse doublet.

Yet another aspect of the subject invention is concerned with a method of displaying images of a succession of recordings from a substantially continuously moving carrier selectively moveable in a first direction and alternatively in a second direction opposite to the first direction, with the aid of an electrically energizable optical compensator of a type being repeatedly advanced through a range of motion so as to compensate for the continuous carrier movement, and being reset through that range of motion by electric pulse doublets. This other aspect of the subject invention resides in the improvement comprising, in combination, the steps of sensing each need for a resetting of the optical compensator through the above mentioned range of motion, providing a first electric pulse and an oppositely poled second electric pulse in response to each sensed need for a resetting, employing the first electric pulse when the carrier is moving in the first direction to generate a first electric pulse doublet comprising a third electric pulse and an oppositely poled fourth electric pulse for resetting the optical compensator when the carrier is moving in the first direction, alternatively employing the second electric pulse when the carrier is moving in the second direction to generate a second electric pulse doublet comprising a fifth electric pulse poled oppositely to the third electric pulse and a sixth electric pulse poled oppositely to the fourth electric pulse, for resetting the optical compensator when the carrier is moving in the second direction, applying the generated first electric pulse doublet to the optical compensator to reset the compensator when the carrier is moving in the first direction, and alternatively applying the generated second electric pulse doublet to the optical compensator to reset the compensator when the carrier is moving in the second direction.

The subject invention is also concerned with apparatus for displaying images of a succession of recordings from a substantially continuously moving carrier, with the aid of an electrically energizable optical compensator of a type being repeatedly advanced through a range of motion to compensate for the continuous carrier movement, and being reset through that range of motion.

In accordance with another aspect of the subject invention, an image display apparatus of the latter type is characterized by the improvement, comprising in combination, means for sensing each need for a resetting of the optical compensator through the above mentioned range of motion, means connected to the sensing means for providing an electric pulse in response to each sensed need for a resetting, means connected to the pulse-providing means for differentiating the electric pulse into a pair of oppositely poled electric spikes, means connected to the differentiating means for providing an electric pulse doublet in response to the oppositely poled electric spikes, and means connected to the doublet providing means for resetting the optical compensator with the electric pulse doublet.

In accordance with a yet further aspect of the subject invention, an apparatus of the above mentioned type is characterized by the improvement, comprising in combination, means for sensing relative movement of each displayed image in a first direction corresponding to the direction of movement of the carrier, and in a second direction opposite to the first direction, means connected to the sensing means for providing a first electric signal indicative of sensed movements of each displayed image in the first and second directions, servo amplifier means connected between the signal-providing means and the optical compensator for advancing the optical compensator through the range of motion in response to the first electric signal, means for sensing each need for a resetting of the optical compensator through the range of motion, and means connected between the reset sensing means and the servo amplifier means for applying to the amplifier means a pair of oppositely poled pulses in response to the sensing of a need for a resetting, with the servo amplifier means being constructed to be driven into saturation by the oppositely poled pulses, and with the servo amplifier means being further constructed to generate a resetting electric pulse doublet for the optical compensator in response to said oppositely poled pulses.

A further aspect of the subject invention is concerned with apparatus for displaying images of a succession of recordings from a substantially continuously moving carrier selectively moveable in a first direction and alternatively in a second direction opposite to the first direction, with the aid of an electrically energizable optical compensator of a type being repeatedly advanced through a range of motion to compensate for the continuous carrier movement, and being reset through that range of motion by electric pulse doublets. According to the subject invention, this apparatus is characterized by the improvement comprising, in combination, first means for sensing each need for a resetting of the optical compensator through the above mentioned range of motion, second means connected to the first means for providing a first electric pulse and an oppositely poled second electric pulse in response to each sensed need for a resetting, third means for providing a first electric pulse doublet in response to the first electric pulse and an oppositely poled second electric pulse doublet in response to the second electric pulse, fourth means connected between the second and third means for selectively applying the first electric pulse to the third means when the carrier is moving in the first direction, and the second electric pulse to the third means when the carrier is moving in the second direction, and fifth means connected to the third means for resetting the compensator in response to the first electric pulse doublet and alternatively in response to the second electric pulse doublet.

BRIEF DESCRIPTION OF THE DRAWINGS

The subject invention will become more readily apparent from the following detailed description of preferred embodiments thereof, illustrated by way of example in the accompanying drawings, in which:

FIG. 2 is a view substantially along lines II – II of FIG. 1;

FIG. 3 is a circuit diagram of a resetting pulse generator and image motion sensor of the projector of FIG. 1;

FIG. 5 is a top view of a photocell combination that may be employed in the image motion sensor of FIGS. 1 and 3;

FIG. 6 is a diagram of an alternative image motion sensor;

FIG. 7 is a diagram of yet another image motion sensor;

DESCRIPTION OF PREFERRED EMBODIMENTS

Figure 1:
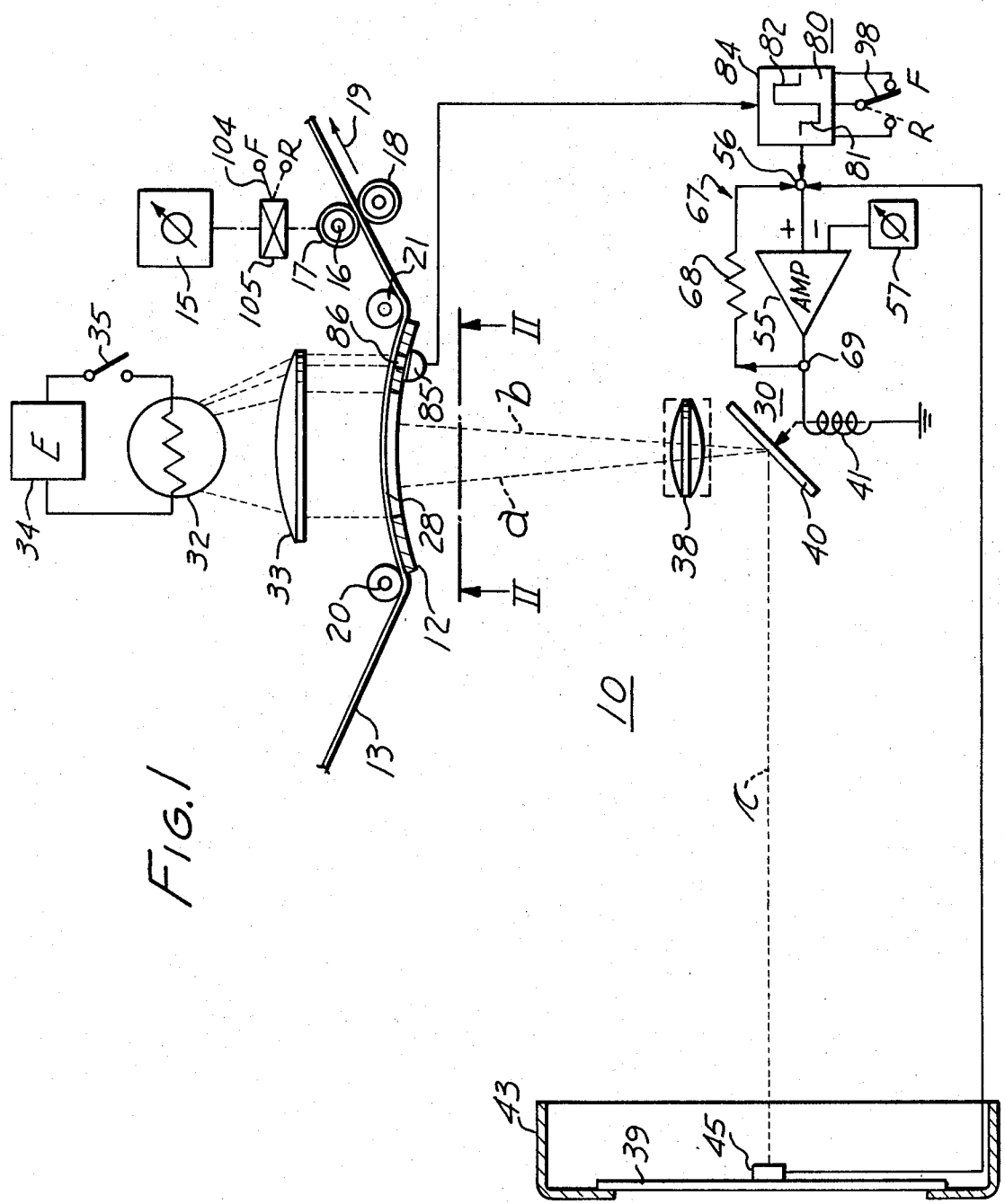
FIG. 1 is a diagrammatic illustration of a non-intermittent or continuous motion picture projector according to a preferred embodiment of the subject invention.

The non-intermittent or continuous motion picture projector 10 shown in FIGS. 1, 2, 3 and 4 has a film gate 12 which may be curved in accordance with well-known principles rendering the angular rate of film advance equal for different points of the film gate.

A conventional variable speed drive 15 has a capstan 16 which may have a rubber lining 17 that engages the film with the aid of a nip roller 18. The drive 15, which may comprise a variable-speed electric motor with reduction gear or an electric motor with variable-speed gear (not shown), is set at any practical speed to advance a motion picture film 13 through the film gate 12 in the direction of an arrow 19 at a substantially continuous or uniform rate (as distinguished from an intermittent film advance). Two guide rollers 20 and 21 assist the movement of the film into and out of the film gate.

In principle, a sprocket drive can be used for advancing the film 13. Where film sprocket holes are employed as control marks, it is, however, preferred that a capstan which does not wear out the sprocket hole areas be used as the power-transmitting device.

The film 13 bears a succession of optically reproducible recordings in the form of transparent images 23 located in image frames 24 and typically representing a filmed scene. The film further has sprocket holes 25 along a margin 26 thereof. In accordance with known principles, the film gate has a projection aperture 28 whose length is at least equal to twice the height of each image frame 24 plus the height of an interframe space 29, so that the continuous motion compensator 30 is able to handle two full image frames in succession. The width of the projection aperture is sufficient for a projection of the sprocket hole that pertains to each projected image in addition to a projection of the image.

Working with projected sprocket holes through which light is transmitted presupposes that the film margin 26 is opaque or black. This typically is, indeed, the case if the film was produced with a reversal development process. If the sprocket hole margin 26 is transparent, a non-reflecting background may be provided behind the margin 26 and light may be projected onto the margin 26. This projected light is reflected by the film in the margin 26, but not by the sprocket holes. Accordingly, instead of sensing luminous sprocket hole images against a dark background, luminous background areas relative to dark sprocket hole images may be sensed in order to determine relative motion of the projected image (see U.S. Pat. No. 3,067,284, by J.L.E. Baldwin, issued Dec. 4, 1962, and herewith incorporated by reference herein). Alternatively, a transparent margin of the film may be provided with opaque spots which accompany corresponding image frames 24, and which are sensed against luminous background areas. Similar expedients may be employed with the sprocket hole sensor 85 to be described below.

The film 13 at the projection gate 28 is illuminated by a projector lamp 32 and condensor lens system 33. The lamp 32, which may have a conventional reflector (not shown), is energized from an electric power source 34 upon closure of a switch 35. A projector lens system 38 projects the illuminated images and sprocket holes by way of the continuous motion compensator 30 onto a conventional back-lighted screen 39. The back-lighted screen is shown by way of example, and a front-lighted screen may be used instead.

The compensator 30 has a first-surface mirror 40 which is repeatedly advanceable by motive power applied to a coil 41 through a range of angular motion so as to compensate for the continuous movement of the film 13. The objective of the compensator mirror 40 is to maintain each projected image substantially stationary. To illustrate this principle a line $a$ in FIG. 1 approximately designates a ray through the center of an image 23 at the beginning of the projection of that image. A line $b$ approximately designates a ray through the center of the same image at the end of the particular projection. The mirror 40 is advanced to maintain the center of the projected image on a line $c$ as the center of the image on the film 13 moves from $a$ to $b$. To maintain each projected image stationary, the mirror 40 has to advance angularly by an angle corresponding substantially to one-half the angle between lines $a$ and $b$.

Since the projection aperture 28 in the film gate 12 is larger than one image, the screen 39 is provided with an opaque frame 43 which blocks from the view of the observer the projected sprocket holes and also parts of images other than the one image that is being projected for viewing at the particular time. The projector lens 38 preferably has its stop plane in front of the lens near the mirror 40 to reduce wandering of the luminous image on the mirror.

A device 45 is located at the screen for sensing relative movements of each displayed image in a first direction corresponding to the direction 19 of movement on the film 13. The device 45 also senses relative movements of displayed images in a second direction opposite the first direction just mentioned. These movements in the second direction occur, for instance, if the compensator mirror 40 overshoots in its forward motion the advance of the film at a particular moment, or while the film 13 is slowing down.

By way of example and as shown in FIG. 5, the motion sensing device 45 may have two conventional photovoltaic cells 47 and 48 mounted adjacent each other. The illuminated sprocket hole appearing at the film gate 28 is projected by way of the compensator mirror 40 onto the light-sensitive parts of the photocells 47 and 48. Each of the photocells 47 and 48 produces an electric signal which varies as a function of the area of cell illumination.

As shown in the schematic of FIG. 3, the cells 47 and 48 are connected in parallel and at opposite output voltage polarities between two terminals 50 and 51 of the sensing device 45. The two output signals of the cells 47 and 48 buck each other, producing no net signal across the terminals 50 and 51 when the photocells 47 and 48 receive equal portions of a projected sprocket hole 53. In the case of projected luminous sprocket holes, the cells 47 and 48 produce a zero net signal in response to equal illumination by portions of the projected sprocket hole. In the case of dark sprocket holes projected with a luminous background surrounding each dark hole, the cells 47 and 48 produce a zero net signal in response to equal illumination by portions of the luminous background above and below the projected sprocket hole.

It may be helpful to note at this juncture that the sensor 45 need not necessarily be located at the screen 39. Rather, the sensor 45 may be positioned closer to the compensator mirror 40 (such as within the projector housing), with a lens (not shown) being provided for imaging the projected sprocket hole onto the sensing device 45.

The projector 10 further includes an amplifier 55 for energizing the compensator coil 41 that moves the mirror 40. In accordance with an important aspect of the subject invention, no routine sawtooth motion is imposed on the compensator mirror 40. Rather, the mirror is only advanced in accordance with the prevailing needs of the system aiming at a stabilization of displayed images in a substantially stationary condition. Since the film 13 is moving, a centered sprocket hole will not stand still in the absence of mirror advance, but will move quickly in a first direction that corresponds to the direction of movement of the film. This produces at the terminals 50 and 51 a net voltage that is applied to the input 56 of the amplifier 55.

This net input voltage causes the amplifier 55 to develop and apply to the compensator coil 41 motive power for angularly moving the compensator mirror in such a sense as to reduce movement of the projected sprocket hole in the named first direction. The compensator mirror will then be advanced in accordance with a stable, substantially constant angular error that is proportional to such stable factors as the damping coefficient of the mirror and mirror suspension and the continuous film speed, as well as inversely proportional to the gain of the servo amplifier or servo loop.

In response to movements of the projected image in the above mentioned first direction, the servo loop including the sensing device 45 and the servo amplifier 55 increases the electric current in the drive coil 41 above the current provided in response to the substantially constant tracking error. Conversely, the servo loop decreases the electric current in the drive coil 41 below the latter current in response to sensed image movements in the above mentioned second direction. In this manner, electric drive power is applied to the compensator in response to sensed image movements in the first direction, whilst the torque generated by the latter current is diminished in response to sensed image movements in the second direction. The result is a mirror drive current that varies relative to a given current and that ideally need not reverse its direction during normal operation of the compensator.

According to another aspect of the invention disclosed in the above mentioned copending patent application, the need for a biasing spring against overshooting is eliminated by providing an electric bias for the compensator 30 and applying this electric bias to the compensator 30 to provide during image display a bias force at the compensator mirror 40 in a direction opposed to the direction of advance of the compensator mirror during image display. By way of example, if the compensator mirror 40 as seen in FIG. 1 angularly advances in a clockwise direction during image display, then the electric bias under consideration is applied to the compensator drive coil 41 so as to provide a biasing force at the compensator mirror 40 in a counter-clockwise direction.

In FIG. 1, a conventional source 57 of variable electric potential or current is shown connected to an input of the amplifier 55 for providing an adjustable electric bias current which is applied to the mirror drive coil 41 in order to bias the mirror 40 in the above mentioned direction.

Unlike a bias spring, the electrical bias applied by the source source 57 provides a biasing force that does not materially increase as a function of mirror advance.

In practice, the electric bias is set for optimum performance by observing the projected images on the screen 39 and adjusting the source 57 until the steadiest image display is achieved.

Another feature of the invention disclosed in the above mentioned copending patent application may be employed either in conjunction with or independently of the electric bias disclosed above. This feature is based on the fact that the sensing device 45 not only provides a net voltage of a first polarity in response to movements of the projected image in a first direction corresponding to the direction of film advance, but provides also a net voltage of an opposite second polarity in response to image movements in an opposite direction. According to the feature under consideration, the servo system supplies the compensator 30 with decelerating power in response to sensed image movements in the latter opposite direction.

Considering in this connection again the schematic of the sensing device 45 shown in FIG. 3, it is seen that the net voltage at the terminal 51 relative to ground will have a first polarity in response to image movements in the first direction, and an opposite second polarity in response to image movements in the second direction. The amplifier 55 is so constructed that it provides in the compensator coil 41 electric currents which have a predetermined sense of current flow in response to the named first polarity of the image movement sensing signal, and which alternatively have an opposite sense of current flow in response to the named second polarity of the image movement sensing signal.

In consequence, the servo system including the amplifier 55 alternatively develops and applies to the compensator coil 41 both motive or driving power and decelerating power. The driving power is applied in response to sensed image movements in the first direction, and the decelerating power is applied in response to sensed image movements in the second direction.

Accordingly, the advancing compensator mirror is subjected to continuous control in both directions about its axis of rocking motion, and a mirror bias spring is unnecessary. The combination of motive powers and decelerating powers has the overall effect of angularly moving the compensator mirror 40 in a net forward direction to compensate for the continuous movement of the film 13 and to maintain practically each displayed image substantially stationary.

Figure 4:
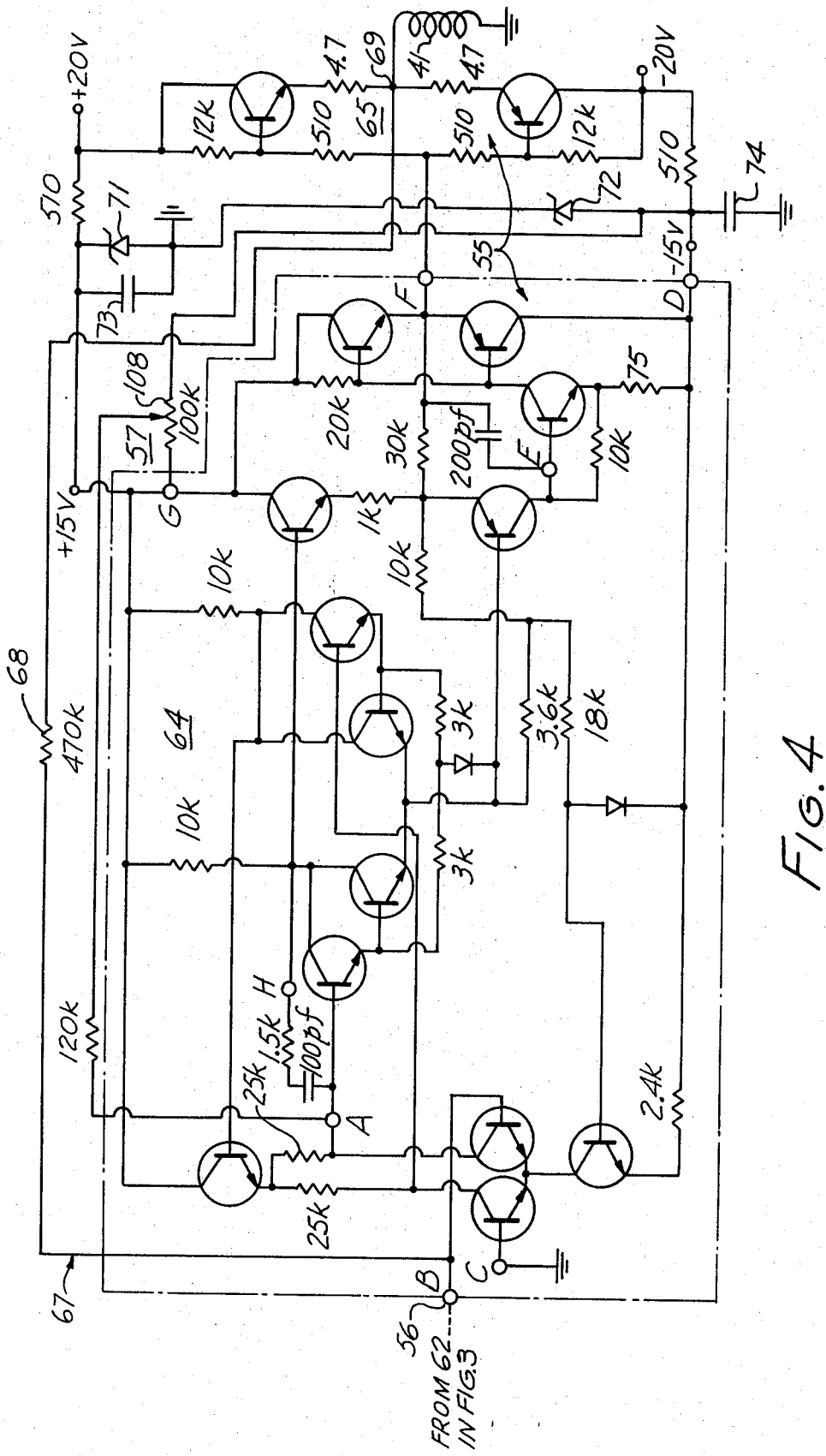
FIG. 4 is a circuit diagram of a servo amplifier and mirror drive of the projector of FIG. 1.

According to FIGS. 3 and 4, the motion sensing device 45 may be connected to the amplifier input terminal 56 through resistors 60 and 61 and a terminal 62. The resistor 60 is adjustable to render the loop gain variable. A capacitor 63 is connected in parallel to the resistors 60 and 61. The combination of resistors 60 and 61 and capacitator 63 provides an adjustable electric damping network, the damping term of which enters the equation of motion of the compensator in addition to the damping caused by the damping coefficient of the compensator mirror 40 and other driven compensator parts.

A preferred amplifier 55 is illustrated in FIG. 4 and comprises an operational amplifier 64 and a complementary emitter follower output stage 65. Those skilled in the art of integrated circuits will recognize that the operational amplifier 64 is available in monolithic form from several manufacturers as standardized circuit 1709 (for instance, MOTOROLA OPAMP MC1709C). Accordingly, a detailed elaboration on the circuit diagram of opamp 64 beyond its illustration in FIG. 4 is unnecessary.

The output stage 65 of the amplifier 55 is of a conventional complementary emitter follower stage design that also does not require any special elaboration as to its circuitry. The feedback path 67 for the amplifier 55, with a feedback resistor 68, is connected between the amplifier output 69 and the amplifier input 56. The compensator coil 41 is connected to the amplifier output 69. The supply voltage stabilizer with Zener diodes 71 and 72 and filter capacitors 73 and 74 is also conventional.

In considering FIG. 4, it will be noted that the amplifier 55, with amplification and output stages 64 and 65, has a bidirectional output in response to a bidirectional input. In this manner, the motive or driving power is applied to the compensator coil 41 in response to displayed image movements in the above mentioned first direction, while decelerating power may be applied to the compensator coil 41 in response to displayed image movements in the above mentioned second direction.

In the illustrated preferred embodiments, all three of the above-identified methods of the subject invention are available. Thus, a damping coefficient which leads to the above mentioned substantially constant torque in the forward direction is mainly provided by a suitable mirror mount (see FIGS. 8 and 9 and their accompanying description below). The above mentioned source 57 of adjustable electric bias is in FIG. 4 provided by a potentiometer 108 connected between positive and negative terminals of the regulated direct-current power source.

The potentiometer 108 has its movable wiper connected to a second input A of the amplifier 64. In this manner, it is possible to electrically bias the compensator mirror 40 in a direction opposite to the direction of mirror advance. If the film 13 is run backwardly, the latter compensator mirror bias may be reversed by adjusting the potentiometer 108. The potentiometer 108 may also be employed for adjusting the position of projected images and sprocket holes relative to the screen 39 or sensing device 45.

In practice, the damping of the compensator mirror 40 tends to provide a substantially constant torque at the mirror. The electric bias provided by the source 57 may be employed to counter that torque to an adjustable extent resulting in optimum performance of the compensator mirror in the advance direction. The mirror drive current will be increased in response to sensed image movements in the above mentioned first direction. Conversely, the mirror drive current will be diminished in response to sensed image movements in the above mentioned second direction.

This mode of operation is generally preferred for image movements in the second direction which are below or equal to a predetermined value representing image movements of a normally occurring type. Because of the capability of the illustrated embodiments to supply both driving power and decelerating power, image movements in the mentioned second direction which exceed the latter predetermined value are automatically countered by the development and application of decelerating power to the compensator drive coil 41.

The combined approach according to the illustrated preferred embodiments is thus capable of handling the various problems that occur in practical continuous motion projectors and similar display apparatus, such as microfilm readers and the like.

Upon completion of the display of an image, the compensator mirror 40 is angularly reset preparatory to the display of the next image. This resetting is effected by timed electric pulse doublets applied to the compensator coil 41. If the polarity of the mirror advance driving power is considered positive, then the resetting doublet 80 comprises a negative pulse 81 followed by a positive pulse 82. The negative pulse 81 angularly drives the mirror 40 backwards at high speed, and the succeeding positive pulse 82 of the doublet prevents an overshooting of the mirror 40 in the reverse direction. This does away with the necessity of a mechanical stop or motion arresting device which has proved its demerits in prior art systems as a fertile source of wear and tear, noise, jitter and other trouble.

The projector 10 of FIG. 1 has a doublet generator 84, a preferred diagram of which is shown in FIG. 1. The doublet generator 84 is timed by a photosensor 85, which, in the embodiment of FIG. 1, is located at the film gate 12. The photosensor 85 acts through a monitor aperture 86. As illustrated in FIG. 2, the monitor aperture 86 is so positioned in the film gate 12 that a sprocket hole 25 appears thereat whenever the projection of an image from has been completed.

According to FIG. 3, a conventional photosensor darlington circuit 88 may be employed in the sensor 85. Upon passage of a sprocket hole, the darlington 88 provides a pulse of the type shown at 90 in FIG. 3. A differentiator circuit 91 converts the pulse 90 into a spike 92. A second differentiation spike is shown in dotted outline, since it is suppressed by a diode 93 in the differentiator 91.

The spike 92 drives a one-shot multivibrator 94 of a conventional type, producing a pulse 95 at a contact F and a pulse 96 at a contact R. The contacts F and R form part of a switch 98. When the projector is set for forward film motion, the switch 98 is in the solidly illustrated position, so that the pulse 95 is applied to a differentiating network 99 via the contact F. In response, the differentiator 99 produces the two oppositely poled spikes 100 shown at the terminal 62.

The terminal 62 being connected to the amplifier input 56, the spike signal 100 is applied to the amplifier 55. The amplitudes of the spikes 100 are such as to drive the amplifier 55 into saturation. This is an important feature since it dispenses with the need of a circuit for disconnecting the image movement sensor 45 during mirror resetting operations. In other words, the oppositely poled spikes 100 not only provide for the requisite pulse doublets, but also effect an automatic suspension of the control operation of the image movement sensor 45 during mirror flyback.

An arrow 102 adjacent the spike signal 100 symbolically leads to the pulse doublet 80 as it appears at the output 69 of the amplifier 55, and as it is applied to the compensator coil 41 to initiate and timely terminate the requisite mirror flyback preparatory to a display of the next image. A potentiometer 97 in the multivibrator 94 permits an adjustment of the doublet pulse energy. This may in accordance with a preferred embodiment of the subject invention be exploited to dimension the power pulse doublet 80 so that it has a net energy sufficient to initiate an advance of the driven compensator part, including the mirror 40, upon completion of the resetting operation. In this manner at least part of the forward acceleration of the compensator system may be provided by the resetting power generator, rather than by the servo loop. This further reduces the power which the servo loop has to supply.

If it is desired to display the motion picture film 13 backwards, the switch 98 is actuated to its illustrated dotted position. This causes the pulse 96 to be applied via the contact R to the differentiator 99. The switch 98 may be ganged with an actuator 104 of a forward-or-reverse gear 105 in the film drive that causes forward advance of the film 13 in the F-position, and reversal of the film travel in the R-position. As mentioned above, the direct-current bias provided by the bias source 57 may then also be reversed by adjustment of the potentiometer 108 shown in FIG. 4.

Application of the pulse 96 to the differentiator 99 in lieu of the pulse 95 causes a polarity of the pulse doublet 80, making the first pulse 81 relatively positive and the second pulse relatively negative. Accordingly, the compensator mirror is angularly reset in what was formerly the advance direction, and is angularly advanced in what was formerly the resetting direction.

By way of recapitulation, it will be recognized that the darlington circuit 88 senses the need for a resetting of the compensator mirror 40. The differentiator 91 and the multivibrator 94 provide an electric pulse 95 (or 96) in response to each sensed need for resetting. The differentiating network differentiates the electric pulse 95 to provide a pair of oppositely poled electric spikes 100. The servo amplifier 55 subjects each pair of spikes 100 to electronic amplification. Since the spikes 100 drive the servo amplifier into saturation, they also are clipped during amplification. In this manner, an electric pulse doublet 80 is generated and is applied to the optical compensator 30 to reset the compensator mirror 40.

Considering the embodiment of FIG. 3 in more detail, it may be said that the sensor 85 provides a first electric pulse 90 in response to each sensed need for a resetting of the mirror 40. The differentiator 91 differentiates and rectifies the first electric pulse 90 so as to provide a first electric spike 92. The multivibrator 94 provides a second electric pulse 95 (or 96) in response to the first electric spike 92. The electric spikes 100 and reset pulse doublet 80 are then provided as described above.

If the images are to be displayed from the backwardly running film as well as from the forwardly running film, the pulse 95 and the oppositely poled pulse 96 provided by the multivibrator stage 94 are alternatively made use of. More specifically, the pulse 95 is employed when the film is running forwardly, to generate a first electric pulse doublet 80 comprising a negative pulse 81 followed by a positive pulse 82. The pulse 96 is employed when the film is running backwardly, to generate a second electric pulse doublet 80' which corresponds closely to the doublet 80, except that the initial pulse 81' thereof is positive, while the second pulse 82' thereof is negative. Generated doublets 80 reset the compensator mirror 40 when the film is moving forwardly, and generated doublets 80' reset the compensator mirror 40 when the film is moving backwardly.

Considering the combined mirror advance and mirror reset operations, it may be said that the sensor 45 senses relative movements of each displayed image in a first direction corresponding to the direction of movement of the film and in a second direction opposite to such first direction. The photocells 47 and 48 and network 60, 61 and 63 provide an electric error signal indicative of sensed movements of each displayed image in the first and second directions. The servo amplifier 55 amplifies this electric error signal and controls the advance of the compensator mirror 40 with that amplified signal.

The sensor 85 senses each need for a resetting of the compensator mirror 40, and the differentiator 91, multivibrator 94 and differentiator network 99 provide in response to each sensed need for resetting a first electric pulse and an oppositely poled second electric pulse in the form of the spikes 100. These first and second pulses 100 drive the servo amplifier 55 into saturation and thus interrupt the amplification of the error signal provided by the sensor 45. In this manner, no particular switching circuit is required for interrupting the amplification of that error signal during mirror reset.

The servo amplifier 55 also amplifies the first and the second pulses 100 to produce an amplified electric pulse doublet 80 with which the mirror 40 is reset.

The preferred ambodiment of FIG. 3 is particularly advantageous in that it only requires a single multivibrator stage 94. This constitutes a significant improvement over the complicated doublet generator circuits disclosed in the above mentioned LASER DISPLAY STUDY.

The image motion sensor 45' of FIG. 6 differs from the sensor 45 of FIG. 5 in that the photocell 47 is replaced by a voltage source 110 with potentiometer 112. The voltage source is so poled and the potentiometer is so adjusted that the voltage provided by the photocell 48 cancels the voltage provided by the potentiometer when, say, one-half of the photosensitive part of the photocell 48 is illuminated. It is then possible to sense positive and negative movements of the displayed image in response to increases and decreases in the area of illumination of the photocell 48. A similar effect is in accordance with FIG. 7 produced when the photocell 47 is exposed to relatively stable light, while only the photocell 48 is exposed to the sprocket hole image 53.

While the sensor of FIGS. 6 and 7 present workable solutions, the sensor according to FIGS. 3 and 5 is preferred for its greater accuracy and ease of operation.

Figure 8:
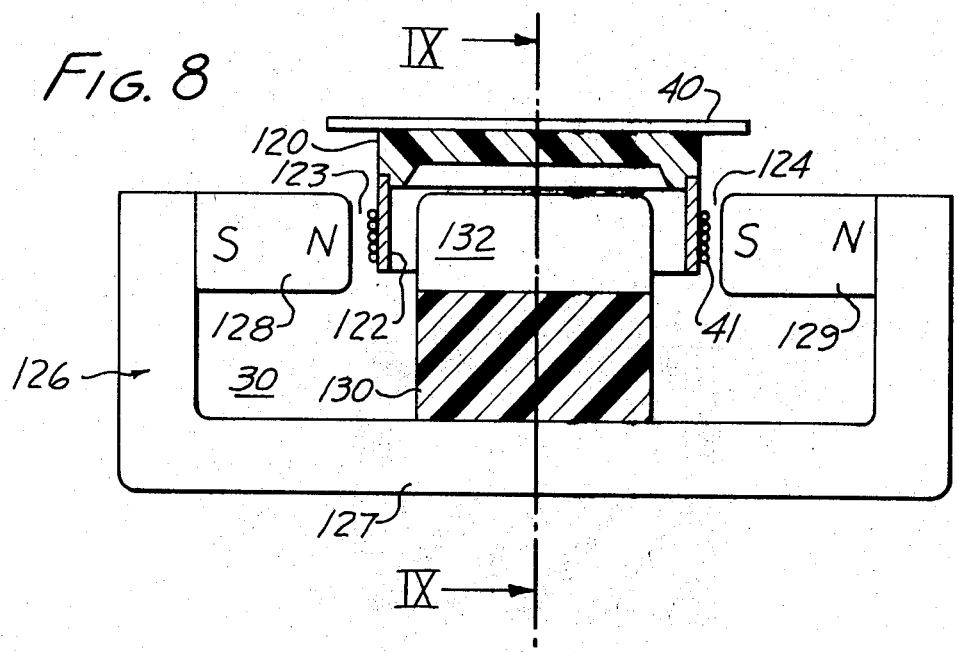
FIG. 8 is a side view, partially in section, of a compensator for use in the practice of the subject invention.
Figure 9:
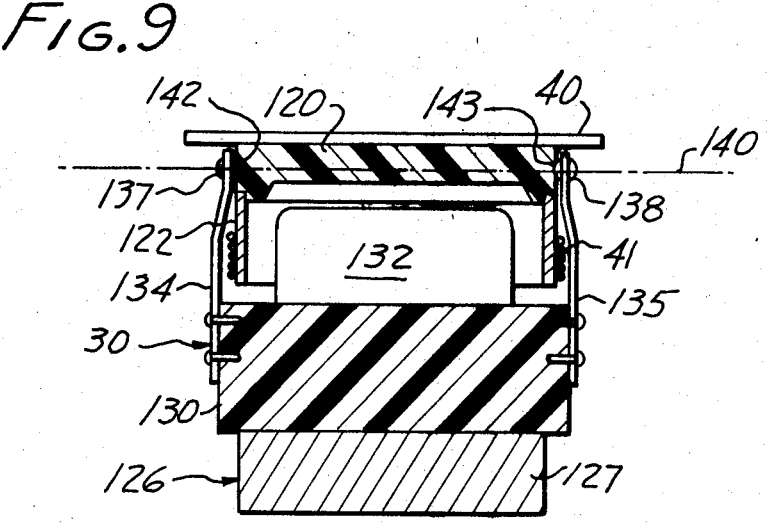
FIG. 9 is a section along line IX – IX of FIG. 8.

A preferred construction of the compensator 30 is shown in FIGS. 8 and 9. According to these figures, the compensator mirror 40 is cemented on a headpiece 120 of non-magnetic material. In a prototype of the illustrated compensator, the headpiece 120 is made of Delrin, an acetal resin made by E.I. Du Pont de Nemours & Company. The compensator drive coil 41 is wound on a tube 122 which is cemented to the headpiece 120. The tube 122 is of non-magnetic material. In principle, the tube may be of an electrically conducting material, such as aluminum, to provide for electrodynamic damping of the compensator. We presently prefer, however, a tube which is neither magnetic nor electrically conducting. In short, the tube 122 is preferably non-magnetic and electrically insulating. The tube 122 partially extends in air gaps 123 and 124 of a magnetic armature 126.

The armature 126 comprises a yoke 127 of soft magnetic material with permanent-magnet pole pieces 128 and 129. A post 130 of non-magnetic material (such as hard plastic resin) is mounted on the yoke 127. A center core 132 is mounted on the post 130 so as to be located between the pole pieces 128 and 129; being spaced therefrom by the airgaps 123 and 124.

A pair of leaf springs 134 and 135 is mounted on the post 130 as shown in FIG. 6. By way of example, these springs may be beryllium leaf springs. Each leaf spring carries a small steel ball 137 and 138. These steel balls act as pivots which mount the headpiece 120 for angular movement about an axis 140. To this effect, the headpiece 120 has small cavities 142 and 143 for receiving the steel balls 137 and 138. If desired, the steel balls may be replaced by semicircular projections of the springs 134 and 135. The steel balls or equivalent projections impose a certain deliberate friction on the driven compensator part formed by the mirror 40, winding 41, headpiece 120, and tube 122.

It will be noted that the preferred compensator of FIGS. 8 and 9 does not have a mirror return bias spring. While I do not categorically exclude the provision of any bias or suspension spring on the driven compensator part, it should be understood that the lack of a mirror bias spring is greatly preferred for the reasons set forth in the above mentioned copending patent application.

I claim:

1. In a method of displaying images of a succession of recordings from a substantially continuously moving carrier, with the aid of an electrically energizable optical compensator of a type being repeatedly advanced through a range of motion so as to compensate for the continuous carrier movement, and being reset through said range of motion by electric pulse doublets, the improvement comprising in combination the steps of:

sensing each need for a resetting of the optical compensator through said range of motion;

providing an electric pulse in response to each sensed need for said resetting;

differentiating said electric pulse so as to provide a pair of oppositely poled electric spikes;

subjecting each pair of said oppositely poled electric spikes to electronic amplification and clipping the electric spikes during said amplification so as to generate an electric pulse doublet for resetting said optical compensator; and applying said generated electric pulse doublet to the optical compensator to reset said compensator.

2. In a method of displaying images of a succession of recordings from a substantially continuously moving carrier, with the aid of an electrically energizable optical compensator of a type being repeatedly advanced through a range of motion so as to compensate for the continuous carrier movement, and being reset through said range of motion by electric pulse doublets, the improvement comprising in combination the steps of:

sensing each need for a resetting of the optical compensator through said range of motion;

providing a first electric pulse in response to each sensed need for said resetting;

differentiating and rectifying said first electric pulse so as to provide a first electric spike;

providing a second electric pulse in response to said first electric spike;

differentiating said second electric pulse so as to provide a pair of oppositely poled second and third electric spikes;

subjecting each pair of oppositely poled second and third electric spikes to electronic amplification and clipping said second and third electric spikes during said amplification so as to generate an electric pulse doublet for resetting said optical compensator; and applying said generated electric pulse doublet to the optical compensator to reset said compensator.

3. In a method of displaying images of a succession of recordings from a substantially continuously moving carrier selectively movable in a first direction and alternatively in a second direction opposite to said first direction, with the aid of an electrically energizable optical compensator of a type being repeatedly advanced through a range of motion so as to compensate for the continuous carrier movement, and being reset through said range of motion by electric pulse doublets, the improvement comprising in combination the steps of:

sensing each need for a resetting of the optical compensator through said range of motion;

providing a first electric pulse and an oppositely poled second electric pulse in response to each sensed need for said resetting;

employing said first electric pulse when said carrier is moving in said first direction to generate a first electric pulse doublet comprising a third electric pulse and an oppositely poled fourth electric pulse for resetting said optical compensator when said carrier is moving in said first direction;

alternatively employing said second electric pulse when said carrier is moving in said second direction to generate a second electric pulse doublet comprising a fifth electric pulse poled oppositely to said third electric pulse and a sixth electric pulse poled oppositely to said fourth electric pulse, for resetting said optical compensator when said carrier is moving in said second direction;

applying said generated first electric pulse doublet to the optical compensator to reset said compensator when the carrier is moving in said first direction; and alternatively applying said generated second electric pulse doublet to the optical compensator to reset said compensator when the carrier is moving in said second direction.

4. A method as claimed in claim 3, wherein:

said first electric pulse doublet is generated by differentiating said first electric pulse when said carrier is moving in said first direction so as to provide a first pair of oppositely poled electric spikes, and by subjecting said first pair of oppositely poled spikes to electronic amplification and by clipping said first pair of spikes during said amplification.

5. A method as claimed in claim 4, wherein:

said second electric pulse doublet is generated by differentiating said second electric pulse when said carrier is moving in said second direction so as to provide a second pair of oppositely poled electric spikes, and by subjecting said second pair of oppositely poled spikes to electronic amplification and by clipping said second pair of spikes during said amplification.

6. In a method of displaying images of a succession of recordings from a substantially continuously moving carrier, with the aid of an electrically energizable optical compensator of a type being repeatedly advanced through a range of motion so as to compensate for the continuous carrier movement, and being reset through said range of motion by electric pulse doublets, the improvement comprising in combination the steps of:

sensing relative movements of each displayed image in a first direction corresponding to the direction of movement of the carrier, and in a second direction opposite to said first direction;

providing a first electric signal indicative of sensed movements of each displayed image in said first and second directions;

amplifying said first electric signal to provide a second electric signal corresponding to said first electric signal;

controlling the advance of said electrically energizable optical compensator with said second electric signal;

sensing each need for a resetting of the optical compensator through said range of motion;

providing a first electric pulse and an oppositely poled second electric pulse in response to each sensed need for said resetting;

interrupting said amplification of said first electric signal in response to said first and second electric pulses;

amplifying said first and second electric pulses to produce an amplified electric pulse doublet; and resetting said optical compensator with said amplified electric pulse doublet.

7. A method as claimed in claim 6, wherein:

the advance of said optical compensator is controlled by driving said electrically energizable optical compensator with said second electric signal.

8. A method as claimed in claim 6, wherein:

said first electric signal and said first and second electric pulses are amplified with the same amplifier; and said amplification of said first electric signal is interrupted by driving said amplifier into saturation with said first and second electric pulses.

9. In apparatus for displaying images of a succession of recordings from a substantially continuously moving carrier, with the aid of an electrically energizable optical compensator of a type being repeatedly advanced through a range of motion to compensate for the continuous carrier movement, and being reset through said range of motion, the improvement comprising in combination:

means for sensing each need for a resetting of the optical compensator through said range of motion;

means connected to said sensing means for providing an electric pulse in response to each sensed need for said resetting;

means connected to said pulse-providing means for differentiating said electric pulse into a pair of oppositely poled electric spikes;

means connected to said differentiating means for providing an electric pulse doublet in response to said oppositely poled electric spikes; and means connected to said doublet-providing means for resetting said optical compensator with said electric pulse doublet.

10. In apparatus for displaying images of a succession of recordings from a substantially continuously moving carrier selectively moveable in a first direction and alternatively in a second direction opposite to said first direction, with the aid of an electrically energizable optical compensator of a type being repeatedly advanced through a range of motion to compensate for the continuous carrier movement, and being reset through said range of motion by electric pulse doublets, the improvement comprising in combination:

first means for sensing each need for a resetting of the optical compensator through said range of motion;

second means connected to said first means for providing a first electric pulse and an oppositely poled second electric pulse in response to each sensed need for said resetting;

third means for providing a first electric pulse doublet in response to said first electric pulse and oppositely poled second electric pulse doublet in response to said second electric pulse;

fourth means connected between said second and third means for selectively applying said first electric pulse to said third means when said carrier is moving in said first direction, and said second electric pulse to said third means when said carrier is moving in said second direction; and fifth means connected to said third means for resetting said compensator in response to said first electric pulse doublet and alternatively in response to said second electric pulse doublet.

11. Apparatus as claimed in claim 10, wherein:

said third means include means for differentiating said first electric pulse and alternatively said second electric pulse, and means connected to said differentiating means for amplifying said differentiated first electric pulse and alternatively said differentiated second electric pulse.

12. In apparatus for displaying images of a succession of recordings from a substantially continuously moving carrier, with the aid of an electrically energizable optical compensator of a type being repeatedly advanced through a range of motion to compensate for the continuous carrier movement, and being reset through said range of motion by electric pulse doublets, the improvement comprising in combination:

means for sensing relative movement of each displayed image in a first direction corresponding to the direction of movement of the carrier, and in a second direction opposite to said first direction;

means connected to said sensing means for providing a first electric signal indicative of sensed movements of each displayed image in said first and second directions;

servo amplifier means connected between said signal-providing means and said optical compensator for advancing said optical compensator through said range of motion in response to said first electric signal;

means for sensing each need for a resetting of said optical compensator through said range of motion; and means connected between said reset sensing means and said servo amplifier means for applying to said amplifier means a pair of oppositely poled pulses in response to said sensing of a need for said resetting, with said servo amplifier means being constructed to be driven into saturation by said oppositely poled pulses, and with said servo amplifier means being further constructed to generate a resetting electric pulse doublet for said optical compensator in response to said oppositely poled pulses.

* * * * *